(12) United States Patent
Fahn et al.

(10) Patent No.: US 8,406,467 B2
(45) Date of Patent: Mar. 26, 2013

(54) METHOD AND SYSTEM FOR ACTIVELY DETECTING AND RECOGNIZING PLACARDS

(75) Inventors: Chin-Shyurng Fahn, Taipei (TW); Po-Hsun Chang, Taoyuan County (TW)

(73) Assignee: National Taiwan University of Science and Technology, Taipei (TW)

( * ) Notice: Subject to any disclaimer, the term of this patent is extended or adjusted under 35 U.S.C. 154(b) by 611 days.

(21) Appl. No.: 12/646,976

(22) Filed: Dec. 24, 2009

(65) Prior Publication Data
US 2010/0310123 A1    Dec. 9, 2010

(30) Foreign Application Priority Data
Jun. 5, 2009    (TW) .............................. 98118784 A

(51) Int. Cl.
*G06K 9/00*    (2006.01)
*G06K 9/48*    (2006.01)
(52) U.S. Cl. ...................... 382/103; 382/200
(58) Field of Classification Search .................. 382/103, 382/176, 200; 348/151, 169; 358/1.9
See application file for complete search history.

(56) References Cited

U.S. PATENT DOCUMENTS

| | | | |
|---|---|---|---|
| 2002/0030741 A1* | 3/2002 | Broemmelsiek | 348/169 |
| 2005/0125683 A1* | 6/2005 | Matsuyama et al. | 713/189 |
| 2006/0061657 A1* | 3/2006 | Rew et al. | 348/151 |
| 2008/0304735 A1* | 12/2008 | Yang et al. | 382/164 |
| 2009/0055778 A1* | 2/2009 | Abdelazim et al. | 715/860 |
| 2010/0074526 A1* | 3/2010 | Campbell | 382/176 |

* cited by examiner

*Primary Examiner* — Amara Abdi
(74) *Attorney, Agent, or Firm* — Jianq Chyun IP Office

(57) ABSTRACT

A method and a system for actively detecting and recognizing a placard are provided. In the present method, an image capturing device is moved according to a maneuver rule, wherein the image capturing device captures an image continuously during the movement. Then whether a placard exists in the image or not is determined. If a placard exists in the image, a content of the placard is identified and a corresponding action is executed. The method repeatedly processes the foregoing steps to further continuously move the image capturing device and determine whether the placard exists in a newly captured image so as to achieve a purpose of detecting and recognizing placards actively.

25 Claims, 3 Drawing Sheets

| Character group | Preset character | Euler number | Character aspect ratio |
|---|---|---|---|
| 1 | 8,B | −1 | N/A |
| 2 | 4,A,D,O,P,Q,R | 0 | ≤1.5 |
| 3 | 0,6,9 | 0 | >1.5 |
| 4 | C,E,G,H,K,M,N,S,T,U,V,W,X,Y,Z | +1 | ≤1.4 |
| 5 | 1,2,3,5,7,F,I,J,L | +1 | >1.4 |

METHOD AND SYSTEM FOR ACTIVELY DETECTING AND RECOGNIZING PLACARDS

CROSS-REFERENCE TO RELATED APPLICATION

This application claims the priority benefit of Taiwan application serial No. 98118784, filed on Jun. 5, 2009. The entirety of the above-mentioned patent application is hereby incorporated by reference herein and made a part of specification.

BACKGROUND OF THE INVENTION

1. Field of the Invention

The present invention relates to a recognition technique of a placard, and particularly relates to a method and a system for detecting and recognizing placards in dynamically captured images.

2. Description of Related Art

Generally, image processing technology may provide any operation of manipulating an image, which includes performing an analysis and processing on the image so as to demonstrate effects of satisfying human visual perception, or transforms the image to a format suitable for being processed by a computer system.

In a case where the image processing technology is gradually mature, application thereof also becomes wider and broader accordingly. In addition to adopting the image processing technology to improve photograph and printing technology, other applications such as satellite images, medical images, and microscope images, are also combined with the image processing technology, thereby producing data helpful for further analysis and applications. Besides, another application developed from the image processing technology is pattern recognition technology, which includes human face recognition, character recognition, fingerprint recognition, autograph identification and so forth.

Based on the image processing technology, both detecting and recognition technologies are mostly developed for processing static images. Taking a car plate recognition system adopted in car parks as an example, the car plate recognition system captures images through a camera equipped on a fixed location so as to perform recognition of the car plate in the image. However, since the location the camera is fixed, the background area in the captured image is almost not changed. In other words, such recognition technology may just perform processing on still images of fixed locations and is not flexible.

SUMMARY OF THE INVENTION

Accordingly, the present invention provides a method for actively detecting and recognizing a placard, and the method may detect a content of any placard encountered when an image capturing device equipped on a system moves along a path at any time, then executes corresponding actions according to the content.

The present invention also provides a system for actively detecting and recognizing a placard. The system continuously captures images and performs actions of detection and recognition on each of the images captured during a movement.

The present invention proposes a method for actively detecting and recognizing a placard; the method first moves an image capturing device according to a maneuver rule, and the image capturing device continuously captures images during the movement. Therefore, whether a placard exists in the image is determined; if a placard exists in the image, then a content of the placard is identified, and an action is executed according to the content of the placard. The present method may repeats the foregoing steps to continuously move the image capturing device according to the maneuver rule and determine whether a placard exists in the newly captured image.

In an embodiment of the present invention, wherein after the step of determining whether the placard exists in the image, the method also includes moving the image capturing device according to the maneuver rule again when no placard exists in the image, and determines whether the placard exists in the newly captured image.

In an embodiment of the present invention, the step of determining whether the placard exists in the image includes segmenting the image into a plurality of blocks and finding a representative color of each of the blocks. The method calculates a contrast between respective representative colors of every two neighboring blocks mentioned above, and further acquires at least a high contrast zone in the image according to the aforementioned contrast. Then a number of edge points in the high contrast zone is checked, and the high contrast zones corresponding to the number of edge points greater than the edge point number threshold value are selected to be the placard area. Subsequently, the placard is determined to exist in the image.

In an embodiment of the present invention, wherein before the step of finding representative colors of each of the blocks, the method also includes respectively obtaining a pixel color of a largest quantity in each of the blocks to be a main color of the corresponding block.

In an embodiment of the present invention, the step of finding the representative color of each of the blocks includes obtaining one of the blocks according to a specific order and comparing the main color of the obtained block with the main color of the neighboring block so as to acquire a color difference therebetween. The main color of the obtained block is selected to be the representative color of the obtained block together with the neighboring block when the color difference is less than a preset color difference value. The main color of the obtained block and the main color of the neighboring block are respectively selected to be the representative colors of the obtained block and the neighboring block when the color difference is greater than or equal to the preset color difference value; the present method repeats the foregoing steps until finding the representative color of each of the blocks is completed.

In an embodiment of the present invention, before the step of acquiring the high contrast zone according to the contrast, the method further includes acquiring a contrast between the respective representative colors of the neighboring blocks in all of the blocks. The aforementioned neighboring blocks are labeled with a first symbol when the contrast is greater than a preset contrast difference value. On the other hand, the aforementioned neighboring blocks are labeled with a second symbol when the contrast is less than or equal to the preset contrast difference value; the present method repeats the foregoing steps until each of the blocks is labeled with the first symbol or the second symbol.

In an embodiment of the present invention, wherein the step of acquiring the high contrast zone in the image according to the contrast includes searching the first symbols whose locations are connected together, and the blocks associated with such first symbols are selected to be the high contrast zone.

In an embodiment of the present invention, the step of identifying the content of the placard includes providing an optical character recognition (OCR) database, and the OCR database comprises a plurality of character groups, each of the character groups respectively corresponds to a topological feature and a shape feature; wherein, each of the character groups includes a plurality of preset characters, and each of the preset characters respectively corresponds to a preset spatial transformation feature. After character regions in the placard area are obtained, they are compared with the content of the OCR database so as to obtain the preset character corresponding to each of the character regions, and the preset character corresponding to each of the character regions is collected together to be the content of the placard.

In an embodiment of the present invention, wherein the step of obtaining the preset character corresponding to the character region includes obtaining the topological feature, capturing the shape feature, and calculating the spatial transformation feature of the character region. First, one of the character groups is obtained according to the topological feature and the shape feature of the character region, and the topological feature and the shape feature corresponding to each of the character groups. Subsequently, after a similarity between the preset spatial transformation feature of each of the preset characters in the obtained character group and the spatial transformation feature is calculated, the characters in the character regions are determined to be the preset characters corresponding to highest similarities.

In an embodiment of the present invention, wherein the step of obtaining one of the character groups includes acquiring the character group by use of its topological feature and shape feature identical to the topological feature and the shape feature of the character region.

In an embodiment of the present invention, wherein the topological feature and the shape feature include an Euler number and a character aspect ratio, respectively.

In an embodiment of the present invention, wherein the spatial transformation feature consists of a projection matrix derived from a between-class scatter matrix and a within-class scatter matrix using linear algebra techniques, and the step of calculating the spatial transformation feature of the character region includes capturing the spatial transformation feature of the character region through a linear discrimination analysis.

In an embodiment of the present invention, wherein before the character region in the placard area is obtained, the present method also includes enhancing an intensity of the placard area.

In an embodiment of the present invention, wherein the preset characters include English alphabets, numbers, symbols, Chinese alphabets, signs, and so forth.

In an embodiment of the present invention, wherein the maneuver rule includes a preset moving path. The step of executing the action according to the content includes an autonomous human-man interaction such as changing the maneuver rule according to the content or delivering an object according to the content.

From another perspective, the present invention provides a system for actively detecting and recognizing a placard. The system includes a wheel control unit, an image capturing device, and a processing unit. Wherein, the wheel control unit drives a movement of the system for actively detecting and recognizing a placard, the image capturing device continuously captures images during the movement, and the processing unit, coupled to the wheel control unit and the image capturing device, enables the wheel control unit to drive the image capturing device to move, and determines whether the placard exists in the image. If a placard exists in the image, then content of the placard is identified and an action is executed according to the content. The processing unit repeats the foregoing operations to continue driving the image capturing device to move according to the maneuver rule and determines whether the placard exists in a newly captured image.

In an embodiment of the present invention, wherein the processor again makes the image capturing device to move according to the maneuver rule when the placard does not exist in the image, and determines whether the placard exists in the newly captured image.

In an embodiment of the present invention, wherein the processing unit segments the image into a plurality of blocks and finds a representative color of each of the blocks. In the aforementioned blocks, a contrast between respective representative colors of every two neighboring blocks is calculated, at least a high contrast zone in the image is further obtained according to the aforementioned contrast, and a number of edge points in the high contrast zone are checked. The processing unit selects the high contrast zone corresponding to the number of edge points greater than an edge point number threshold value to be a placard area, and determines the placard exists in the image.

In an embodiment of the present invention, wherein the processing unit respectively obtains a pixel color of a largest quantity in each of the blocks to be a main color of the corresponding block. In addition, the processing unit obtains one of the blocks according to a specific sequence, and compares the main color of the obtained blocks with the main colors of the neighboring blocks to acquire a color difference therebetween. The main color of the obtained block is selected to be the representative color of the obtained block together with the neighboring blocks when the color difference is less than a preset color difference value. The main color of the obtained block and the main color of the neighboring blocks are respectively selected to be the representative colors of the obtained block and the neighboring blocks when the color difference is greater than or equal to the preset color difference value. The processing unit repeats the foregoing operations until finding the representative color of each of the blocks is completed.

In an embodiment of the present invention, wherein the processing unit acquires a contrast of the representative colors of every two neighboring blocks in all of the blocks. When the contrast is greater than a preset contrast difference value, the aforementioned neighboring blocks are labeled with a first symbol. When the contrast is less than or equal to the preset contrast difference value, the aforementioned neighboring blocks are labeled with a second symbol. The processing unit repeats the foregoing actions until each of the blocks is labeled with the first symbol or the second symbol.

In an embodiment of the present invention, wherein the processing unit searches the first symbols whose locations are connected together, and selects the blocks associated with such first symbols to be the high contrast zone.

In an embodiment of the present invention, the system for actively detecting and recognizing a placard further includes a storage unit coupled to the processing unit for storing an OCR database. The OCR database includes a plurality of character groups, wherein each of the character groups respectively possesses a topological feature and a shape feature, and each of the character groups includes a plurality of preset characters. Wherein, each of the preset characters respectively has a spatial transformation feature. After the processing unit obtains character regions in the placard area, the character regions are compared with the content of the OCR database so as to obtain the preset character corresponding to each of the character regions, and the preset character corresponding to each of the character regions is collected together to be the content of the placard.

In an embodiment of the present invention, wherein the processor captures the topological feature and the shape feature, and calculates a spatial transformation feature of the character regions. First, one of the character regions is obtained according to the topological feature and the shape feature corresponding to each of the character groups. Then the processing unit respectively calculates a similarity between the spatial transformation feature and the preset spatial transformation feature of each of the preset characters in the obtained character groups, and determines the character in the character region to be the preset character corresponding to a highest similarity.

In an embodiment of the present invention, the processor acquires the character groups with the topological features and the shape features identical to the topological features and the shape features of the character regions.

In an embodiment of the present invention, wherein the topological feature and the shape feature include an Euler number and a character aspect ratio, respectively.

In an embodiment of the present invention, wherein the spatial transformation feature consists of a projection matrix derived from a between-class scatter matrix and a within-class scatter matrix using linear algebra techniques, and the processing unit captures the spatial transformation feature of the character regions through a linear discrimination analysis.

In an embodiment of the present invention, wherein the processing unit enhances an intensity of the placard area.

In an embodiment of the present invention, wherein the preset characters include English characters, numbers, symbols, Chinese alphabets, signs, and so forth.

In an embodiment of the present invention, wherein the maneuver rule includes a preset moving path.

In an embodiment of the present invention, the processing unit changes the maneuver rule according to the content or delivers an object according to the content.

In an embodiment of the present invention, the system for actively detecting and recognizing a placard further includes a range sensor unit equipped with a laser range finder and some ultrasonic sensors for detecting environment information. Wherein, the processing unit enables the wheel control unit according to the environment information to move the system for actively detecting and recognizing a placard.

In view of the above, the present invention not only performs detecting and recognizing the placard in the image, but also, especially, continues to capture the image during the movement and continuously and actively detect and recognize the placard in the image so as to execute the corresponding actions accordingly.

In order to make the aforementioned and other features as well as the advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention, and, together with the description, serve to explain the principles of the invention.

DESCRIPTION OF EMBODIMENTS

Figure 1:
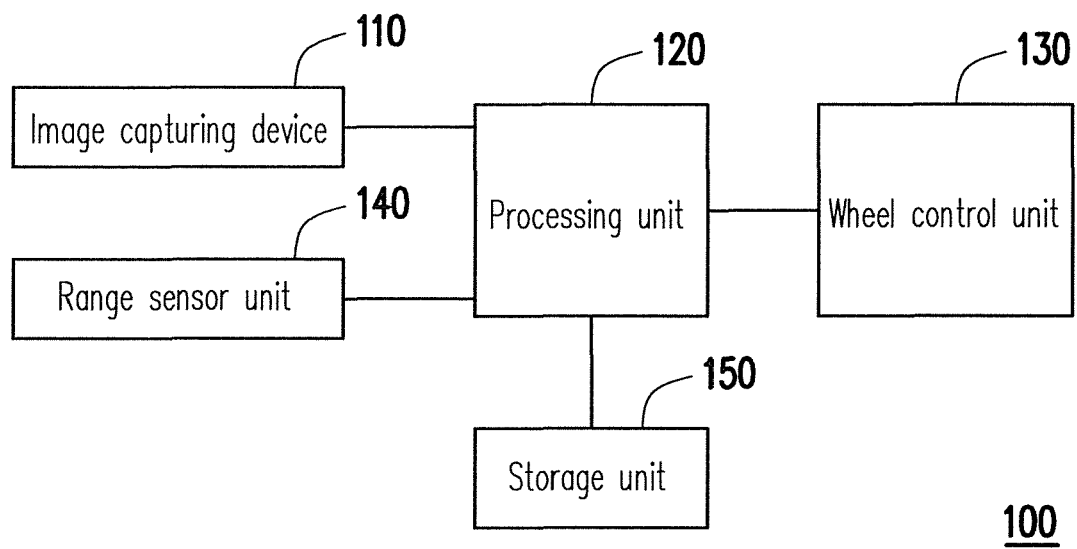
FIG. 1 is a schematic diagram illustrating a system for actively detecting and recognizing a placard according to an embodiment of the present invention.

FIG. 1 is a schematic diagram illustrating a system for actively detecting and recognizing a placard according to an embodiment of the present invention. Referring to FIG. 1, in the present embodiment, a system 100 for actively detecting and recognizing placards includes an image capturing device 110, a processing unit 120, a wheel control unit 130, a range sensor unit 140, and a storage unit 150.

Wherein, the image capturing device 110, for example, may be a large angle rotation, tilt, lens automatic focus and high magnification Pan-Tilt-Zoom (PTZ) camera. The image capturing device 110 then may continuously capture images after an activation, and transmit the captured images to the processing unit 120 through, for example, a Universal Serial Bus (USB) interface.

The wheel control unit 130, for example, includes a microcontroller (e.g., a BASIC Stamp 2 chip), a left wheel, a right wheel, and a direct current (DC) motor driver. The wheel control unit 130 may communicate with the processing unit 120 through an RS-232 interface and the microcontroller further enables the DC motor driver to perform a rotation speed control on both the left wheel and the right wheel according to the commands of the processing unit 120 so as to propel the system 100 for actively detecting and recognizing placards to move. It should be noted that, a framework of the aforementioned wheel controller 130 is just an exemplary embodiment of the present invention and a scope of the present invention is not limited thereto.

The processing unit 120 may be hardware (e.g., a chipset) with a processing capability, a set of software components or a combination of hardware components and software components, and enables the system 100 for actively detecting and recognizing placards according to the maneuver rule. The processing unit 120 drives the image capturing device 110 to be able to capture the images while the system 100 is moving. In the present embodiment, the processing unit 120 determines whether a placard exists in the captured image. If a placard exists in the image, a content of the placard is recognized and identified according to an optical character recognition (OCR) database in the storage unit 150 and a corresponding action is executed according to the content.

The system 100 for actively detecting and recognizing a placard would continue to move according to the maneuver rule, and the image capturing device 110 may capture new images during the movement, and therefore, the processing unit 120 may repeat the foregoing operations to continuously detect and recognize the placard in the newly captured images. In order to prevent an unnecessary collision of the system 100 for actively detecting and recognizing a placard during the movement, in the present embodiment, the range sensor unit 140 may transmit the detected environment information to the processing unit 120 through the RS-232 interface. Then, the processing unit 120 controls the wheel control unit 130 according to the environment information to propel the system 100 for actively detecting and recognizing a placard to move.

Figures 2, 3:
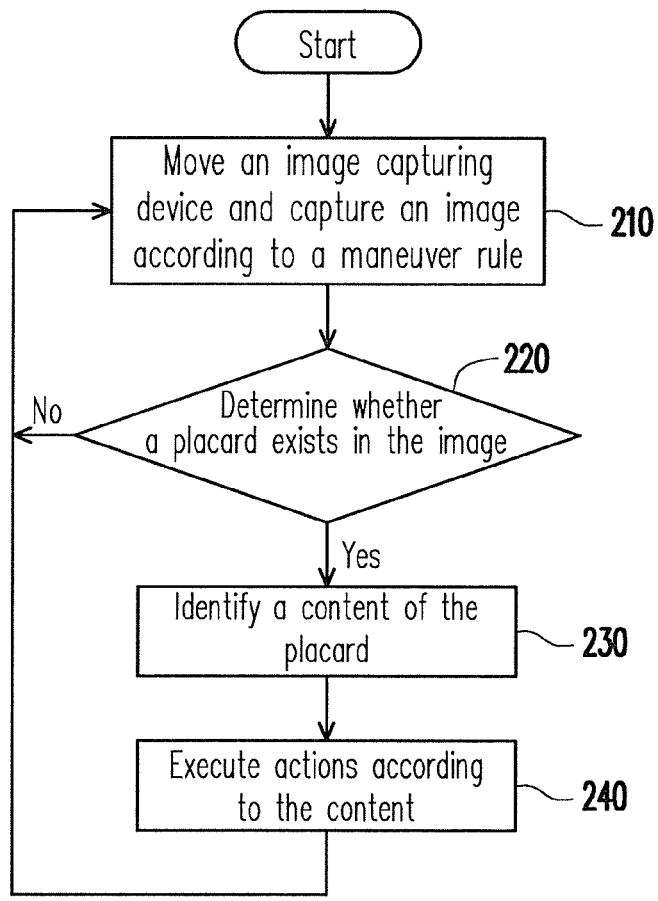
FIG. 2 is a flowchart illustrating a method for actively detecting and recognizing a placard according to an embodiment of the present invention.
FIG. 3 is a table illustrating five character groups and their preset characters according to an embodiment of the present invention.

In order to further describe how the processing unit 120 actively detects and recognizes a placard in the image during the movement of the system 100 for actively detecting and recognizing a placard, another embodiment is especially taken for descriptions below. FIG. 2 is a flowchart illustrating a method for actively detecting and recognizing a placard according to an embodiment of the present invention. Referring to both FIG. 1 and FIG. 2, after the system 100 for actively detecting and recognizing a placard is activated, first as illustrated in Step 210, the processing unit 120 enables the wheel control unit 130 according to the maneuver rule to propel the whole system 100 for actively detecting and recognizing a placard, and drives the image capturing device 110 to capture the images during the movement according to the maneuver rule; wherein, the maneuver rule may be a preset moving path and may also be moving forward along a specific object (e.g., office partitioning boards), but the scope of the present invention is not limited thereto.

Next, as illustrated in Step 220, after receiving the capture images from the image capturing device 110, the processing unit 120 determines whether a placard exists in the images. In the present embodiment, the processing unit 120 determines whether a placard area exists in the images according to a color distribution and a contrast distribution in the images.

To be more specific, the processing unit 120 first segments the image into a plurality of blocks and respectively obtains a pixel color of a largest quantity in each of the blocks to be a main color of the corresponding block. For example, if each of the blocks is 5×5 pixels, then an image containing 640×480 pixels may be divided into 128×96 blocks.

Next, in order to gather blocks with similar colors in the image to be a group, the processing unit 120 has to further find a representative color for each of the blocks; wherein, the processing unit 120 obtains one of the blocks according to a specific rule, and then compares the main color of the obtained block with the main colors of the neighboring blocks in order to acquire a color difference therebetween. When the color difference is less than a preset color difference, it means that colors of the two blocks are very close to each other. Therefore, the main color of the obtained block is selected to be the representative color of the obtained block together with the neighboring block. However, the main color of the obtained block and the main color of the neighboring block are respectively selected to be the representative color of the obtained block and the neighboring block when the color difference is greater than or equal to the preset color difference value. The processing unit 120 may repeat the foregoing operations until finding the representative color of each of the blocks is completed.

For example, the processing unit 120 may sequentially perform the foregoing actions to each of the blocks from an upper left position towards a lower right position of the image, and each time when the main colors of the obtained block and the neighboring blocks are similar to each other (i.e., the color difference is less than the preset color difference), the main color of the neighboring block is replaced by the main color of the obtained block so as to further achieve an objective of sequentially dyeing all of the main colors of the neighboring blocks with similar colors.

Next, the processing unit 120 calculates a contrast between respective representative colors of every two neighboring blocks in all of the blocks, and acquires high contrast zones according to the aforementioned contrast. Furthermore, after the processing unit 120 acquires the contrast between the respective representative colors of every two neighboring blocks and when the contrast is greater than the preset contrast difference value, the aforementioned neighboring blocks are labeled with a first symbol (e.g., 1). When the contrast is less than the preset contrast difference value, the aforementioned neighboring blocks are labeled with a second symbol (e.g., 0). The processing unit 120 may repeat the foregoing operations until each of the blocks is labeled with the first symbol or the second symbol.

After the completion of labeling blocks with symbols, the processing unit 120 searches the first symbols whose locations are connected together and selects the blocks associated with such first symbols to be a high contrast zone. There should be a good color contrast between the colors of characters and the background of the placard such that a distinguishable edge of character regions and the background is produced. Therefore, the processing unit 120 continues to execute the edge detection to examine a number of edge points in each of the high contrast zones, and deletes the high contrast zones containing too low number of edge points. The processing unit 120 selects the high contrast zone corresponding to the number of edge points greater than an edge point number threshold value to be a placard area, and determines the placard exists in the image after the placard area is found.

If the processing unit 120 determines that no placard exists in the captured image currently, then returns to Step 210 to repeat moving the image capturing device according to the maneuver rule and capturing an image, then determines whether a placard exists in the image. However, if the processing unit 120 determines a placard exists in the image, then as illustrated in Step 230, the processing unit 120 identifies and recognizes the content of the placard. In an embodiment, before the processing unit 120 performs the OCR, the intensity of the placard area in the image is enhanced so as to enlarge a contrast of images thereby producing a better recognition result.

In the present embodiment, the storage unit 150 records an OCR database. The OCR database includes a plurality of character groups; each of the character groups respectively corresponds to a topological feature and a shape feature. Wherein, each of the character groups includes a plurality of preset characters, and each of the preset characters respectively corresponds to a preset spatial transformation feature. When the processing unit 120 recognizes the content of the placard, all possible character regions in the placard area are obtained first. For each of the character regions, the processing unit 120 captures the topological feature and the shape feature thereof, and compares the aforementioned topological feature and the aforementioned shape feature with the topological feature and the shape feature of each of the character groups in the OCR database. Then the character group with the topological feature and the shape feature identical to the topological feature and the shape feature of the character region is obtained. Subsequently, a similarity between the preset spatial transformation feature of each of the preset characters in the obtained character group and the spatial transformation feature of the character region is respectively calculated, and the characters in the character regions are determined to be the preset characters corresponding to highest similarities. The processing unit 120 obtains the preset characters corresponding to each of the character regions in the placard area by use of the aforementioned method and regards the aforementioned preset characters to be the content of the placard.

In other words, as long as a character in the character regions belongs to any preset character recorded in the OCR database, the processing unit 120 is able to identify and recognize the character as a type thereof. In the present embodiment, the topological feature and the shape feature of the character regions corresponding to the character group include an Euler number and a character aspect ratio, and the preset characters may be English alphabets, numbers, symbols, Chinese characters, signs (e.g., an arrow sign), and so forth, but the scope of the present invention is not limited thereto.

For a convenience of description, in an embodiment, assume that the preset characters are 26 English alphabets in capital form and 10 Arabic numbers from 0 to 9. The preset characters may be categorized into five groups according to the Euler number and a character aspect ratio. That is to say, the OCR database comprises five character groups. The Euler number and the character aspect ratio of each of the character groups, and the preset characters included are shown in FIG. 3. Wherein, the spatial transformation feature corresponding to each of the preset characters, which consists of a projection matrix derived from a between-class scatter matrix and a within-class scatter matrix using linear algebra techniques, may be obtained through performing a linear discrimination analysis on some training data. After the processing unit 120 obtains the character regions, the character aspect ratios of the character regions are then acquired. Next, the character regions are normalized to a fixed size, and converted into binary images. In the sequel, the Euler number may be calculated after mathematical morphology processing like performing dilation and erosion operations. By means of two features such as the Euler number and the character aspect ratio of the character regions, which character groups in the OCR database correspond to the character regions may be determined. Assuming that the character region corresponds to Character group 1, then after the processing unit 120 extracts the spatial transformation feature (e.g., using a projection matrix derived from a between-class scatter matrix and a within-class scatter matrix) through a linear discrimination analysis, the spatial transformation feature would be compared with the respective spatial transformation feature of a preset character "8" and a preset character "B" in Character group 1 so as to respectively acquire a similarity between the spatial transformation feature of the obtained character region and the spatial transformation feature of the preset character "8", and a similarity between the spatial transformation feature of the obtained character region and the spatial transformation feature of the preset character "B." Suppose the spatial transformation feature of the preset character "8" and the spatial transformation feature of the obtained character region have a higher similarity, then the processing unit 120 may determine the character in the character region to be the number "8."

After identifying the content of the placard, as illustrated in Step 240, the processing unit 120 correspondingly executes an action according to the content. In an embodiment, the processing unit 120 may change the maneuver rule according to the content; for example, enabling the wheel control unit 130 to drive the system 100 for actively detecting and recognizing a placard to turn left and proceed towards a left direction in a case that the content of the placard is recognized to be an arrow directing to the left. In another embodiment, the processing unit 120 may deliver the object according to the content, such as correspondingly delivering data like personal documents in a case that the content of the placard is recognized to be a person's name. In addition, the processor 120 may also play corresponding video files according to the recognized content, and here, the executed actions are not limited thereto.

The system 100 for actively detecting and recognizing a placard is able to dynamically detect the content of the placard. The system 100 for actively detecting and recognizing a placard captures images through an image capturing device 110, and the processing unit 120 then performs detections of a placard. If the placard is not detected, then the system 100 for actively detecting and recognizing a placard may continue to proceed. If the placard is detected, then the processing unit 120 performs the recognition of the placard, and the system 100 for actively detecting and recognizing a placard may execute corresponding actions according to the recognized result. It should be noted that, no matter what shape of the placard and what type of characters are, as long as the colors of characters and the background in the placard have a certain degree of color difference, then the system 100 for actively detecting and recognizing a placard is able to identify the content thereof.

Figure 4:
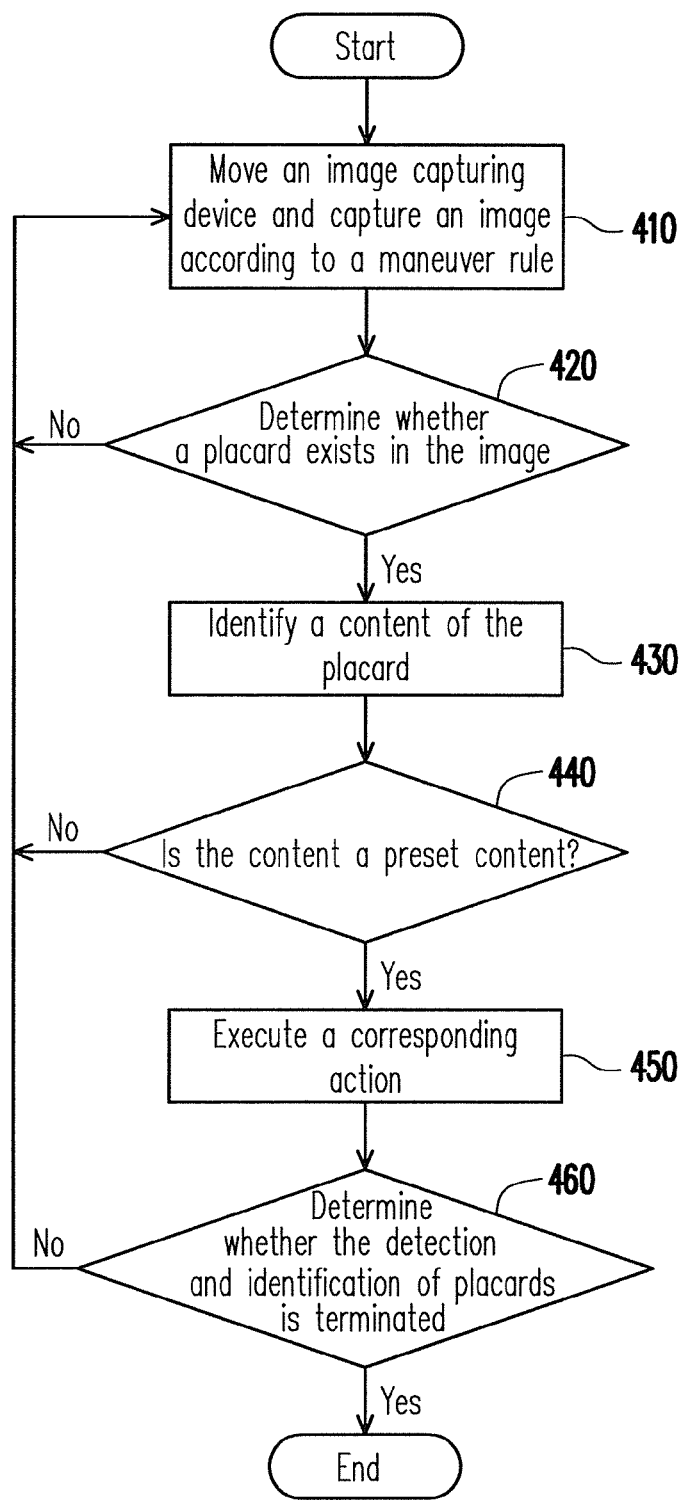
FIG. 4 is a flowchart illustrating a method for actively detecting and recognizing a placard according to another embodiment of the present invention.

FIG. 4 is a flowchart that illustrates a method for actively detecting and recognizing a placard according to another embodiment of the present invention. Referring to both FIG. 1 and FIG. 4, in the present embodiment, first, as illustrated in Step 410, the system 100 for actively detecting and recognizing a placard may move according to the maneuver rule, which drives the image capturing device 110 to move accordingly and captures images during the movement. Subsequently, in Step 420, the processing unit 120 determines whether a placard exists in the image. If the placard is not detected, then the method returns back to Step 410 to continue to move the system 100 for actively detecting and recognizing a placard, and captures new images. However, if the placard is detected in the image, then as illustrated in Step 430, the processing unit 120 identifies the content of the placard. Since the steps of detecting and recognizing the placard are identical to or similar to the aforementioned embodiments, they will not be repeatedly described herein.

Next, in Step 440, whether the recognized content is a preset content is determined. If the recognized content does not belong to the preset content, then it means that the processing unit 120 is able to successfully recognize the placard, but since there is no action corresponding to the content of the placard recorded in the system 100 for actively detecting and recognizing a placard, then the method returns back to Step 410 to move the system 100 for actively detecting and recognizing a placard again and captures a new image to perform detection and recognition. Otherwise, if the recognized content is the preset content, then the corresponding actions are executed as illustrated in Step 450. Next, in Step 460, whether to terminate the detection and recognition of a placard is determined. If it is determined not to terminate the detection and recognition of a placard, then the method returns back to Step 410 in the same manner to perform the capture of a new image again. Otherwise, this process of actively detecting and recognizing the placard is terminated.

In summary, the method and the system for actively detecting and recognizing a placard provided by the present invention are able to perform the detection and the recognition of placards on dynamic and continuous images, and not limited to the shape of the placard and the content of the placard. When the system proceeds according to the moving path, the placards encountered may be detected at any time, and the corresponding actions may be executed. In addition, when the method and the system are implemented on an autonomous robot, the objectives of controlling the robot to change a movement direction or deliver an object in time automatically according to the recognized contents of the placards are achieved.

Although the present invention has been described with reference to the above embodiments, it will be apparent to one of the ordinary skills in the art that modifications to the described embodiment may be made without departing from the spirit of the invention. Accordingly, the scope of the invention will be defined by the attached claims, not by the above detailed descriptions.

What is claimed is:

1. A method for actively detecting and recognizing a placard, the method comprising:
   moving an image capturing device according to a maneuver rule, wherein the image capturing device continuously captures an image during the movement;
   determining whether a placard exists in the image by steps of:
      segmenting the image into a plurality of blocks;
      obtaining respectively a pixel color of a largest quantity in each of the blocks as a main color corresponding to the block;
      finding a representative color of each of the blocks;
      calculating a contrast between respective representative colors of every two neighboring blocks in the blocks;
      acquiring at least a high contrast zone in the image according to the contrasts;
      checking a number of edge points in each of the high contrast zones; and
      selecting a high contrast zone corresponding to the number of edge points greater than an edge point number threshold value to be a placard area, and determining the placard exists in the image;
   wherein the step of finding the representative color of each of the blocks comprises:
      obtaining one of the blocks according to a specific order;
      comparing the main color of the obtained block with the main color of its neighboring block so as to acquire a color difference therebetween;
      making the main color of the obtained block to be the representative color of the obtained block together with the neighboring block when the color difference is less than a preset color difference value;
      making the main color of the obtained block and the main color of the neighboring block to be the representative color respectively when the color difference is greater than or equal to the preset color difference value; and
      repeating the foregoing steps until finding the representative color of each of the blocks is completed;
   identifying a content of the placard by steps of:
      providing an optical character recognition (OCR) database that consists of a plurality of character groups, wherein each of the character groups respectively corresponds to a topological feature and a shape feature, each of the character groups includes a plurality of preset characters, and each of the preset characters respectively corresponds to a preset spatial transformation feature;
      obtaining at least a character region in the placard area;
      comparing each of the character regions with the content of the OCR database so as to obtain the preset character corresponding to each of the character regions by steps of:
         for each of the character regions, capturing the topological feature of the character region, capturing the shape feature of the character region, calculating a spatial transformation feature of the character region, acquiring one of the character groups according to the topological feature and the shape feature corresponding to each of the character groups, calculating respectively a similarity between the spatial transformation feature and the preset spatial transformation feature of each of the preset characters in the obtained character group, and determining a character in the character region to be the preset character corresponding to a highest similarity; and
      selecting the preset characters respectively corresponding to each of the character regions to be the content of the placard;
   executing an action according to the content if the placard exists in the image; and repeating the foregoing steps to continuously move the image capturing device according to the maneuver rule and determining whether the placard exists in the image newly captured.

2. The method for actively detecting and recognizing a placard as claimed in claim 1, wherein after the step of determining whether the placard exists in the image, the method further comprises:
   moving the image capturing device according to the maneuver rule and determining whether the placard exists in the image newly captured if the placard does not exist in the image.

3. The method for actively detecting and recognizing a placard as claimed in claim 1, wherein before the step of acquiring the high contrast zones in the image according to the contrasts, the method further comprises:
   acquiring the contrast between the respective representative colors of neighboring blocks in the blocks;
   labeling the aforementioned neighboring blocks with a first symbol when the contrast is greater than a preset contrast difference value;
   labeling the aforementioned neighboring blocks with a second symbol when the contrast is less than or equal to the preset contrast difference value; and
   repeating the foregoing steps until each of the blocks is labeled with the first symbol or the second symbol.

4. The method for actively detecting and recognizing a placard as claimed in claim 3, wherein the step of acquiring the high contrast zones in the image according to the contrasts comprises:
   searching the first symbols whose locations are connected together; and
   selecting the blocks corresponding to the first symbols whose locations are connected together to be one of the high contrast zones.

5. The method for actively detecting and recognizing a placard as claimed in claim 1, wherein the step of obtaining one of the character groups according to the topological feature and the shape feature comprises:
   acquiring the character group with the topological feature and the shape feature identical to the topological feature and the shape feature of the character region.

6. The method for actively detecting and recognizing a placard as claimed in claim 1, wherein the topological feature and the shape feature comprise an Euler number and a character aspect ratio, respectively.

7. The method for actively detecting and recognizing a placard as claimed in claim 1, wherein the preset spatial transformation feature consists of a projection matrix derived from a between-class scatter matrix and a within-class scatter matrix using linear algebra techniques, and the step of calculating the spatial transformation feature of the character region comprises:
   capturing the spatial transformation feature of the character region through a linear discrimination analysis.

8. The method for actively detecting and recognizing a placard as claimed in claim 1, wherein before the step of obtaining the character regions in the placard area, the method further comprises:

enhancing an intensity of the placard area.

9. The method for actively detecting and recognizing a placard as claimed in claim 1, wherein the preset characters comprise English alphabets, numbers, symbols, Chinese characters, and signs.

10. The method for actively detecting and recognizing a placard as claimed in claim 1, wherein the maneuver rule comprises a preset moving path.

11. The method for actively detecting and recognizing a placard as claimed in claim 1, wherein the step of executing the action according to the content comprises:

changing the maneuver rule according to the content.

12. The method for actively detecting and recognizing a placard as claimed in claim 1, wherein the step of executing the action according to the content comprises:

delivering an object according to the content.

13. A system for actively detecting and recognizing a placard, the system comprising:

a wheel control unit for driving a movement of the system for actively detecting and recognizing a placard;

an image capturing device for capturing an image continuously during the movement;

a processing unit, coupled to the wheel control unit and the image capturing device, for enabling the wheel control unit according to a maneuver rule to drive the image capturing device to move; determining whether a placard exists in the image, and identifying a content of the placard and executing an action according to the content if the placard exists in the image; and repeating the foregoing operations to continue driving the image capturing device to move according to the maneuver rule and determining whether the placard exists in the image newly captured;

a storage unit, coupled to the processing unit, supplying an OCR database that contains a plurality of character groups, wherein each of the character groups respectively corresponds to a topological feature and a shape feature, each of the character groups includes a plurality of preset characters, and each of the preset characters respectively corresponds to a preset spatial transformation feature, wherein the processing unit segments the image into a plurality of blocks, finds a representative color of each of the blocks, calculates a contrast between the representative colors of every two neighboring blocks in the blocks, acquires at least a high contrast zone in the image according to the contrasts, checks a number of edge points in each of the high contrast zones, selects a high contrast zone corresponding to the number of edge points greater than an edge point number threshold value to be a placard area, and determines the placard exists in the image, wherein the processing unit respectively obtains a pixel color of a largest quantity in each of the blocks as a main color corresponding to the block; obtains one of the blocks according to a specific order, compares the main color of the obtained block with the main color of its neighboring block so as to acquire a color difference therebetween, and makes the main color of the obtained block to be the representative color of the obtained block together with the neighboring block when the color difference is less than a preset color difference value; otherwise, respectively makes the main color of the obtained block and the main color of the neighboring block to be the representative color when the color difference is greater than or equal to the preset color difference value, and repeats the foregoing operations until the finding of the representative color of each of the blocks is completed;

wherein the processing unit acquires at least a character region in the placard area, compares each of the character regions with the content of the OCR database so as to obtain the preset character corresponding to each of the character regions, and selects the preset characters respectively corresponding to each of the character regions to be the content of the placard, and wherein the processing unit captures the topological feature and the shape feature of the character region, further calculates a spatial transformation feature of the character region, then acquires one of the character groups according to the topological feature and the shape feature corresponding to each of the character groups, respectively calculates a similarity between the spatial transformation feature of the character region and the preset spatial transformation feature of each of the preset characters in the obtained character group, and determines a character in the character region to be the preset character corresponding to a highest similarity.

14. The system for actively detecting and recognizing a placard as claimed in claim 13, wherein, when the placard does not exist in the image, the processing unit drives the image capturing device to move according to the maneuver rule and determines whether the placard exists in the image newly captured.

15. The system for actively detecting and recognizing a placard as claimed in claim 13, wherein the processing unit acquires the contrast between the respective representative colors of the neighboring blocks, labels the aforementioned neighboring blocks with a first symbol when the contrast is greater than a preset contrast difference value; otherwise, labels the aforementioned neighboring blocks with a second symbol when the contrast is less than or equal to the preset contrast difference value, and repeats the foregoing operations until each of the blocks is labeled with the first symbol or the second symbol.

16. The system for actively detecting and recognizing a placard as claimed in claim 15, wherein the processing unit searches the first symbols whose locations are connected together, and selects the blocks corresponding to the first symbols whose locations are connected together to be one of the high contrast zones.

17. The system for actively detecting and recognizing a placard as claimed in claim 13, wherein the processing unit acquires the character group with the topological feature and the shape feature identical to the topological feature and the shape feature of the character region.

18. The system for actively detecting and recognizing a placard as claimed in claim 13, wherein the topological feature and the shape feature comprise an Euler number and a character aspect ratio, respectively.

19. The system for actively detecting and recognizing a placard as claimed in claim 13, wherein the preset spatial transformation feature consists of a projection matrix derived from a between-class scatter matrix and a within-class scatter matrix using linear algebra techniques, and the processing unit captures the spatial transformation feature of the character region through a linear discrimination analysis.

20. The system for actively detecting and recognizing a placard as claimed in claim 13, wherein the processing unit enhances an intensity of the placard area.

21. The system for actively detecting and recognizing a placard as claimed in claim 13, wherein the preset characters comprise English alphabets, numbers, symbols, Chinese characters, and signs.

22. The system for actively detecting and recognizing a placard as claimed in claim 13, wherein the maneuver rule comprises a preset moving path.

23. The system for actively detecting and recognizing a placard as claimed in claim 13, wherein the processing unit changes the maneuver rule according to the content.

24. The system for actively detecting and recognizing a placard as claimed in claim 13, wherein the processing unit delivers an object according to the content.

25. The system for actively detecting and recognizing a placard as claimed in claim 13 further comprising:

a range sensor unit, coupled to the processing unit, detecting an environment information, wherein the processing unit enables the wheel control unit according to the environment information so as to drive the movement of the system for actively detecting and recognizing a placard.

* * * * *